United States Patent
Kim et al.

(10) Patent No.: US 9,628,660 B2
(45) Date of Patent: Apr. 18, 2017

(54) METHOD AND DEVICE FOR RECOGNIZING DOCUMENT IMAGE, AND PHOTOGRAPHING METHOD USING THE SAME

(71) Applicant: Samsung Electronics Co., Ltd., Suwon-si, Gyeonggi-do (KR)

(72) Inventors: Moo-Rim Kim, Yongin-si (KR); Mu-Sik Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 14/079,156

(22) Filed: Nov. 13, 2013

(65) Prior Publication Data

US 2014/0132799 A1    May 15, 2014

(30) Foreign Application Priority Data

Nov. 13, 2012 (KR) .................. 10-2012-0128147

(51) Int. Cl.
*G06K 9/20* (2006.01)
*H04N 1/21* (2006.01)
*G06K 9/00* (2006.01)
*G06K 9/46* (2006.01)

(52) U.S. Cl.
CPC ....... *H04N 1/2166* (2013.01); *G06K 9/00456* (2013.01); *G06K 9/00684* (2013.01); *G06K 9/00463* (2013.01); *G06K 9/4671* (2013.01)

(58) Field of Classification Search
CPC .................................................. G06K 9/00456
USPC ............................... 348/231.2; 382/159, 201
See application file for complete search history.

(56) References Cited

U.S. PATENT DOCUMENTS

| 6,233,353 | B1 | 5/2001 | Danisewicz |
| 7,053,939 | B2 * | 5/2006 | Lin ................. H04N 1/00795 348/239 |
| 8,521,737 | B2 | 8/2013 | Hart et al. |
| 2001/0012400 | A1 * | 8/2001 | Wang ............... G06K 9/00456 382/181 |
| 2003/0072568 | A1 | 4/2003 | Lin et al. |

(Continued)

FOREIGN PATENT DOCUMENTS

KR    10-0979457 B1    9/2010

OTHER PUBLICATIONS

Rosten et al, "Machine Learning for High-Speed Corner Detection", XP019036410, Jan. 2006.

(Continued)

Primary Examiner — Joel Fosselman
(74) Attorney, Agent, or Firm — Jefferson IP Law, LLP (57) ABSTRACT

A method and a device for recognizing a document image, and a photographing method using the same are provided. The method includes extracting, from an input image, a primary feature, including information on feature points, by determining each pixel that is not similar to comparison pixels to be a feature point through a comparison of the pixel to the comparison pixels spaced a predetermined distance apart from the pixel, and classifying the input image as a document image or a non-document image by applying preset primary classification criteria, including criteria for the total number of the feature points to the primary feature.

19 Claims, 9 Drawing Sheets
(4 of 9 Drawing Sheet(s) Filed in Color)

(56) References Cited

U.S. PATENT DOCUMENTS

2005/0281463 A1* 12/2005 Yi ..................... G06K 9/00456
382/173
2009/0245640 A1 10/2009 Li et al.

OTHER PUBLICATIONS

Bai et al., "Video Caption Duration Extraction", International Conference on Pattern Recognition, XP055257107, Dec. 2008.
Du et al.,"Dot Text Detection Based on FAST Points", 2011 International Conference on Document Analysis and Recognition, XP055257108, Sep. 2011.

* cited by examiner

METHOD AND DEVICE FOR RECOGNIZING DOCUMENT IMAGE, AND PHOTOGRAPHING METHOD USING THE SAME

CROSS-REFERENCE TO RELATED APPLICATION(S)

This application claims the priority under 35 U.S.C. §119(a) of a Korean patent application filed on Nov. 13, 2012 in the Korean Intellectual Property Office and assigned Serial No. 10-2012-0128147, the entire disclosure of which is hereby incorporated by reference.

TECHNICAL FIELD

The present disclosure relates to a technology of analyzing an image photographed by a photographing device, such as a digital camera. More particularly, the present disclosure relates to a method and a device for recognizing a document image from a photographed image, and a photographing method using the same.

BACKGROUND

In recent years, Digital Still Camera (DSC) functions that are applied to a general digital camera and a camcorder have been applied, as an essential element, to a portable terminal, such as a smart phone, a cell phone, a Portable Multimedia Player (PMP), an Motion Picture Experts Group (MPEG) Audio Layer 3 (MP3) player, a personal navigation device, a Personal Computer (PC), a laptop PC, a tablet, and any other similar and/or suitable portable electronic device, in order to enhance user convenience.

Users may take, or capture, a photograph by using a portable terminal at anytime and anywhere. Recently, due to a rapid progress of a performance and a content storage capacity of a camera mounted to a portable terminal, users may photograph printed-matter, such as a book, papers, and a pamphlet, mainly containing texts in addition to people and scenery, and may store an image in which the corresponding printed-matter is photographed, wherein the image in which the corresponding printed-mater is photographed may be referred to as a 'document image', thereby utilizing the camera for preserving information recorded in the corresponding printed-matter.

According to the trend, a technology of determining whether an image that will be currently photographed is a document image and accordingly performing an appropriate and automatic adjustment for photographing conditions, including the aperture value, has been proposed. The technology is disclosed in U.S. Pat. No. 7,053,939 (Hewlett-Packard Development Company) entitled "Automatic document detection method and system" issuing to Qian Lin et al. on May 30, 2006.

In the above-mentioned related art, considering the fact that there are a comparatively large number of edge portions in a document image due to characters, an image that is input through a camera is divided into equal-sized areas, edges are detected for each of the areas, and a determination is made, for the area, as to whether the number of the edges is larger than a given threshold value, for detection of a document image. The image is determined as a document image when the total number of areas, where the number of the edges is larger than the threshold value, exceeds a specific reference value.

In the method of the related art, although a document image may be accurately judged to a certain extent, an image having a large number of edges, like an image having a complicated pattern, is more likely to be misjudged. Moreover, in a case of a document having large-sized characters, a small number of characters, or a variety of sizes or fonts, or in a case of a document having a table, such as a bus schedule, a menu table, or a calendar, the corresponding image is difficult to accurately judge as a document image.

Accordingly, there is a need for technologies to more accurately judge document images for various types and shapes of information-printed matter in daily use in addition to typical document images such as a book and papers.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a device for recognizing a document image, and a photographing method using the same, wherein document images for various types and shapes of information-printed matter, which are difficult to determine as a document image in the related art, may be more accurately judged.

In accordance with an aspect of the present disclosure, a method of recognizing a document image is provided. The method includes extracting, from an input image, a primary feature, including information on feature points, by determining each pixel that is not similar to comparison pixels to be a feature point through a comparison of the pixel to the comparison pixels spaced a predetermined distance apart from the pixel, and classifying the input image as a document image or a non-document image by applying preset primary classification criteria, including criteria for a total number of the feature points, to the primary feature.

In accordance with another aspect of the present disclosure, a device for recognizing a document image is provided. The device includes a camera unit configured to photograph an external target object, and an image processing unit configured to perform an image processing operation on at least one of an image photographed by the camera unit and images transferred from an external device, wherein the image processing unit is configured to extract, from an input image, a primary feature, including information on feature points by determining each pixel that is not similar to comparison pixels to be a feature point through a comparison of the pixel to the comparison pixels spaced a predetermined distance apart from the pixel, and wherein the image processing unit is configured to classify the input image as a document image or a non-document image by applying preset primary classification criteria, including criteria for a total number of the feature points to the primary feature.

In accordance with an aspect of the present disclosure, a photographing method using a document image recognizing technology is provided. The photographing method includes performing a photographing operation on a target object through a preset photographing manipulation, and classifying and storing a photographed image as a document image or non-document image, wherein the classifying of the photographed image includes receiving the photographed image, and extracting, from an input image, a primary feature, including information on feature points by determining each pixel that is not similar to comparison pixels to be a feature point through a comparison of the pixel to the comparison pixels spaced a predetermined distance apart from the pixel; and classifying the input image as a document image or a non-document image by applying preset primary classification criteria, including criteria for a total number of the feature points to the primary feature.

In accordance with an aspect of the present disclosure, a photographing method using a document image recognizing technology is provided the method includes displaying images, which are being input through a camera unit, as preview images, selecting one still image from among the preview images, classifying the selected still image as a document image or a non-document image, setting a document photographing condition or a non-document photographing condition depending on the result of the classifying of the selected still image, and performing a photographing operation depending on the currently set document photographing condition or the non-document photographing condition when a preset manipulation of a photographing key is detected, wherein the classifying the selected still image includes receiving the selected still image, extracting, from an input image, a primary feature, including information on feature points, by determining each pixel that is not similar to comparison pixels to be a feature point through a comparison of the pixel to the comparison pixels spaced a predetermined distance apart from the pixel, and classifying the input image as a document image or a non-document image by applying preset primary classification criteria, including criteria for the total number of the feature points, to the primary feature.

As described above, the present disclosure provides a method and a device for recognizing a document image, and a photographing method using the same, which can more accurately judge document images for various types and shapes of information-printed matter which are difficult to determine as a document image in the related art.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although particular matters such as specific operation processes, specific numerical values of classification criteria for a document image, or various screens will be illustrated in the following description, it will be obvious to those skilled in the art to which the present disclosure pertains that the particular matters are provided only to help a comprehensive understanding of the present disclosure, and various modifications and changes can be made within the scope of the present disclosure.

Figure 1:
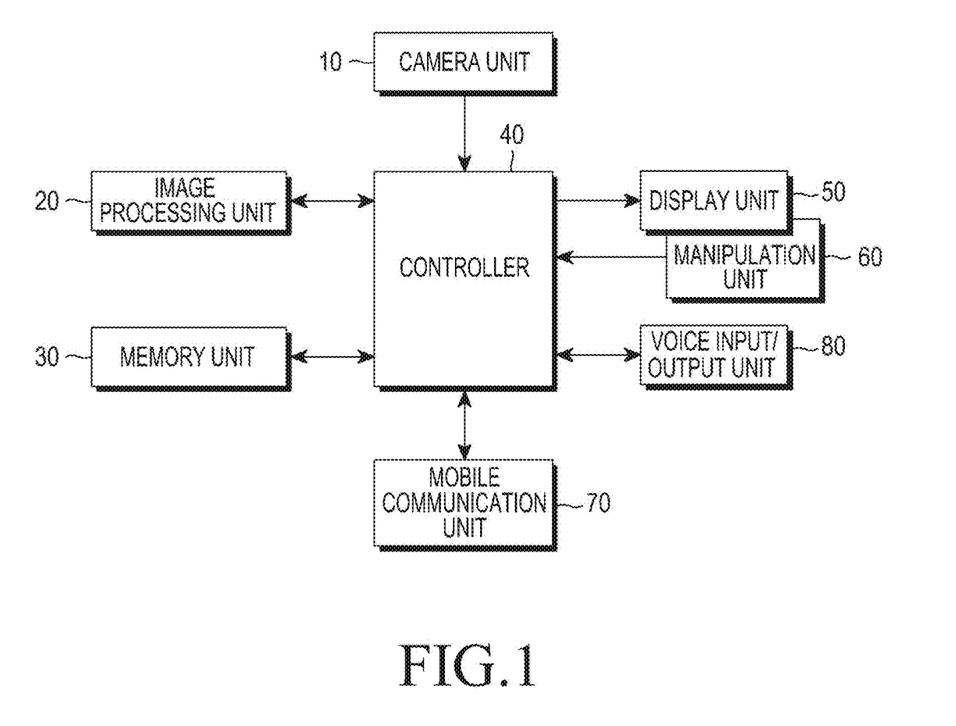
FIG. 1 is a block diagram illustrating a portable terminal for which a document image recognizing device is employed according to an embodiment of the disclosure.

FIG. 1 is a block diagram illustrating a portable terminal for which a document image recognizing device is employed according to an embodiment of the present disclosure.

Referring to FIG. 1, the portable terminal, for which the document image recognizing device is employed, according to the present disclosure, includes a camera unit 10, an image processing unit 20, a memory unit 30, a controller 40, a display unit 50, and a manipulation unit 60.

The camera unit 10 performs a general function of a digital camera that photographs at least one of a still image and a moving image of an external target object by using visible light reflected from the external target object. The camera unit 10 includes a photographing unit configured with a Charge Coupled Device (CCD) image sensor, and in addition to that, may include an illumination sensor for measuring intensity of illumination, a distance sensor for measuring a focal length for a subject. The image processing unit 20 performs an overall operation for image processing, such as converting an image photographed by the camera unit 10 into digital image data of a suitable format, through processing data for the image, and more particularly, performs an operation of analyzing at least one of images photographed by the camera unit 10 and images transferred from an external device and performs an operation of recognizing whether the images are a document image, according to a feature of the present disclosure.

The display unit 50 may be generally configured with a Liquid Crystal Display (LCD) screen to display execution images, operation statuses, or menu statuses of various application programs in the corresponding portable terminal, and may be implemented as a structure of a touch screen. However, the present disclosure is not limited thereto, and the display unit 50 may be configured with any suitable and/or similar display device, such as a Light Emitting Diode (LED) display, an Organic LED display, a Thin Film Transistor display, and other similar display device types. The manipulation unit 60 is configured with a touch screen controller interworked with the display unit 50 to receive an input through user manipulations on a touch screen, and includes buttons for manipulating a plurality of operations, wherein the buttons are mechanically installed to a keypad or an external housing of the corresponding device, to receive an input through user manipulations of the buttons.

The controller 40 generally controls the respective functional units and operations of the corresponding portable terminal in addition to controlling a document image recognizing operation according to a feature of the present disclosure. The memory unit 30 stores various contents, various application programs and related contents, user generated data, and data related to operation processing, in addition to the photographed image.

In addition to that, the portable terminal includes a mobile communication unit 70 and a voice input/output unit 80. The mobile communication unit 70 includes an antenna for mobile communication, and performs a wireless signal processing operations for a mobile communication function. The voice input/output unit 80 includes a speaker and a microphone, receives a user's voice input or outputs an audible sound to the user when a phone call is made depending on the mobile communication function, and outputs operation tones corresponding to various operations or sounds corresponding to various digital audio and video contents.

Moreover, the portable terminal may further include functional units, such as a power supply unit configured with a rechargeable battery, a Global Positioning System (GPS) unit, a vibration motor, a motion sensor detecting a movement status of the corresponding device, and any other similar and/or suitable functional unit, element, device, and/or unit which are generally employed for the portable terminal.

Although the image processing unit 20 and the controller 40 have been separately configured in the above description, the image processing unit 20 and the controller 40 may also be physically or logically implemented as a single unit.

Figure 2:
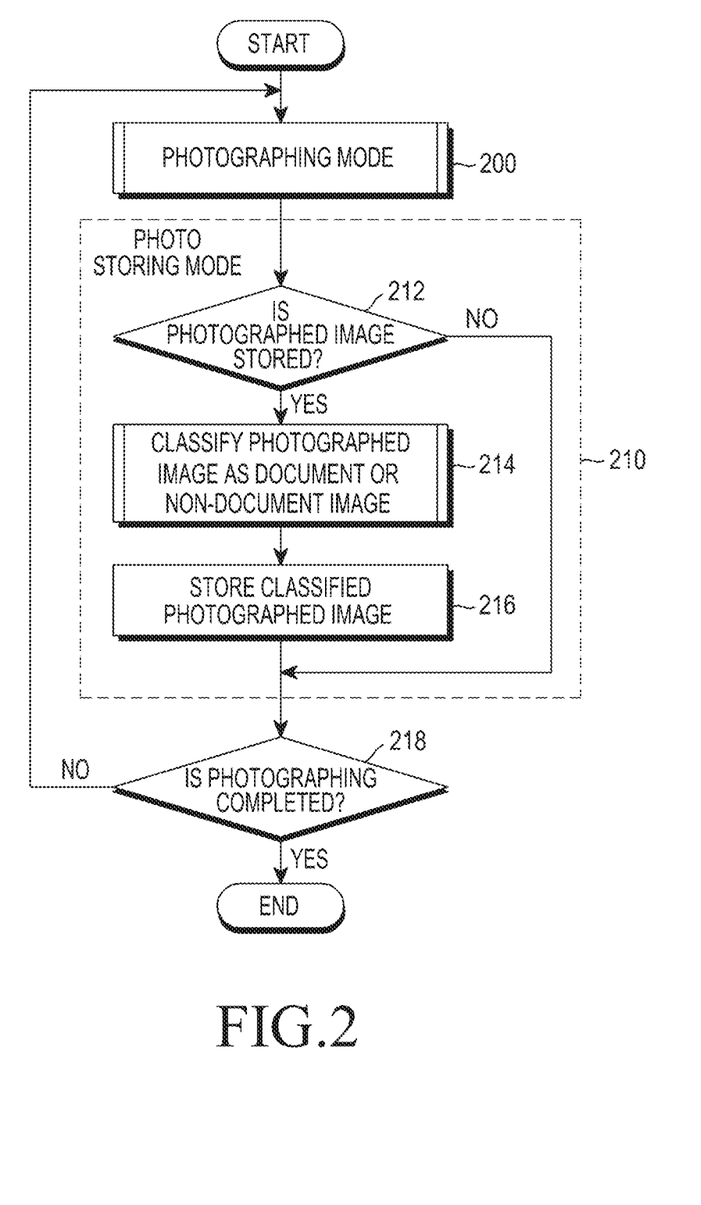
FIG. 2 is a flowchart illustrating a photographing operation to which a document image recognizing operation is applied according to an embodiment of the present disclosure.

FIG. 2 is a flowchart illustrating a photographing operation to which a document image recognizing operation is applied according to an embodiment of the present disclosure.

Referring to FIG. 2, the photographing operation may be performed under control of the controller in the device illustrated in FIG. 1. As illustrated in FIG. 2, photographing operations to which the present disclosure may be applied may be largely classified into an operation in a photographing mode 200 and an operation in a photo storing mode 210, and by way of example, a document image recognizing method of the present disclosure is performed in the photo storing mode 210.

The photographing operation illustrated in FIG. 2 may be initiated through a user manipulation of a photographing key, or in other words, a physical button, such as a shutter key, that is configured to execute a photographing and/or photography operation, separately installed in advance in a portable terminal, or a user selection of a menu for photographing in a menu environment. Considering photographing conditions, such as a distance between the portable terminal and a target object to be photographed, luminance, and the like, a photographing operation is performed in the photographing mode 200 when a user manipulates a shutter key, i.e. the photographing key, and then the photographing mode 200 is switched to the photo storing mode 210.

In the photo storing mode 210, a determination is first made, in operation 212, as to whether a photographed image is stored. The determination may be made through a user manipulation according to displaying a message in the appropriate form via a display unit, wherein the message inquires a user about whether the currently photographed image is stored. The photo storing mode 210 is completed and operation 218 is performed when it is determined, in operation 212, that the photographed image has not been stored, and operation 214 is performed when it is determined, in operation 212, that the photographed image has been stored.

In operation 214, the photographed image is classified as a document or non-document image through recognition of a text image for the photographed image according to a feature of the present disclosure. Thereafter, in operation 216, the photographed image, which has been classified as a document or non-document image, is stored. When the classified photographed image is stored in operation 216, the photographed image that has been classified as a document image and the photographed image that has been classified as a non-document image may be differently stored in separate storage folders, or the photographed image that has been classified as a document image may also be stored in a state where meta data, denoting that the photographed image is a document image, is displayed thereon.

Thereafter, in operation 218, a determination is made as to whether a condition for completing the photographing, such as an input of a separately set end key, for example, a home button, is satisfied. When it is determined, in operation 218, that the condition for completing the photographing has not been satisfied, then the operation flow returns to the photographing mode 200 and the above-mentioned operations are repeatedly performed, and when it is determined, in operation 218, that the condition for completing the photographing has been satisfied, then the photographing operation is completed.

The photographing operation may be performed through the operations illustrated in FIG. 2 according to an embodiment of the present disclosure. Although it has been illustrated that a user separately selects whether the photographed image is stored, the photographed image may be automatically stored without operation 212 in another embodiment of the present disclosure.

Figure 3:
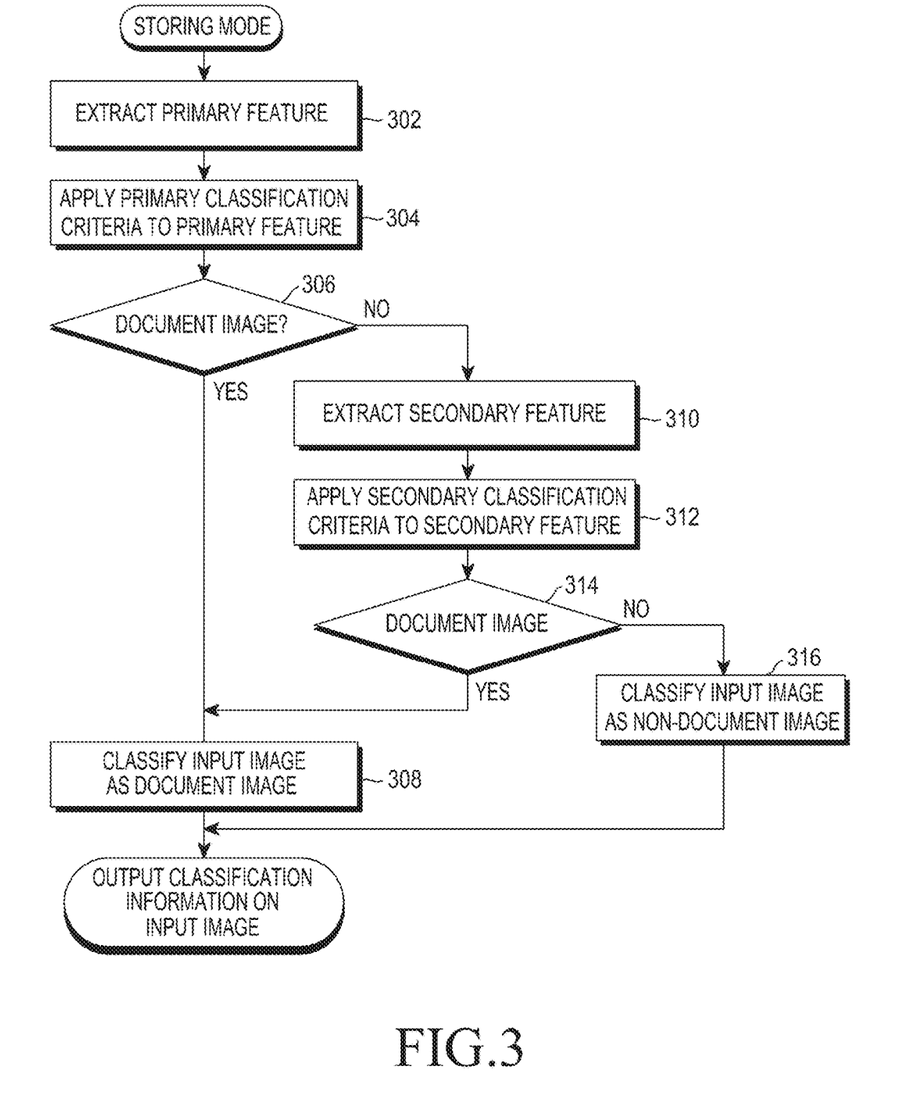
FIG. 3 is a flowchart illustrating a document image recognizing operation according to an embodiment of the present disclosure.

FIG. 3 is a flowchart illustrating a document image recognizing operation according to an embodiment of the present disclosure.

Referring to FIG. 3, the document image recognizing operation may be applied to operation 214 in the photo storing mode 210 illustrated in FIG. 2, in which the photographed image is classified as a document or non-document image in operation 214. Although such an operation, as illustrated in FIG. 3, may be performed through the controller illustrated in FIG. 1, the operation related to FIG. 3 may be separately performed in the image processing unit, or by any other similar and/or suitable processing unit. As illustrated in FIG. 3, in the document image recognizing operation according to the embodiment of the present disclosure, a primary feature is first extracted from a corresponding input image in operation 302.

The extracting of the primary feature in operation 302 includes extracting information on a pixel, which is not similar to comparison pixels, through a comparison of the corresponding pixel to the neighboring and/or peripheral comparison pixels, which are not adjacent to the corresponding pixel and are spaced a predetermined distance apart from the corresponding pixel, for each pixel in the corresponding input image. Such a method, as described above, may be referred to as a "FAST feature" algorithm, and the pixel, which is not similar to the peripheral comparison pixels, may be referred to as a "feature point". Further operations illustrated in FIG. 3 will be discussed below with reference to FIGS. 4, 5A, 5B, and 6.

Figure 4:
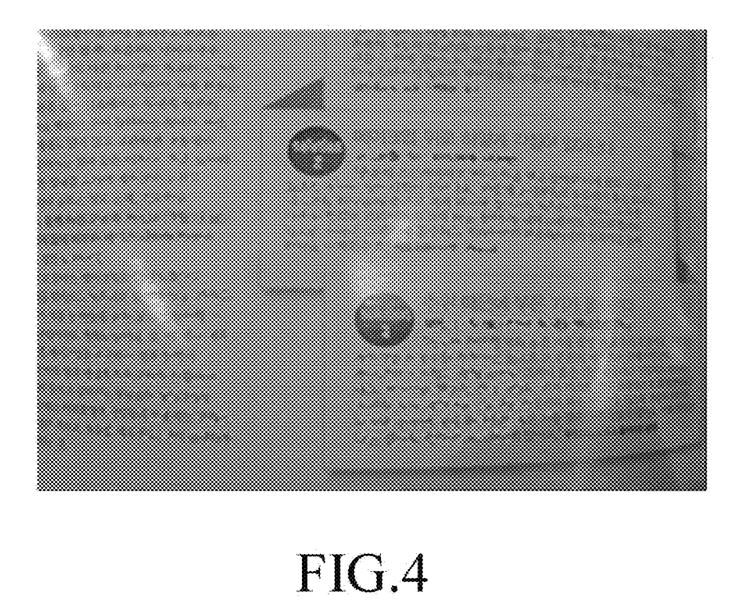
FIG. 4 illustrates an image in which a primary feature is extracted according to an embodiment of the present disclosure.
Figure 5A:
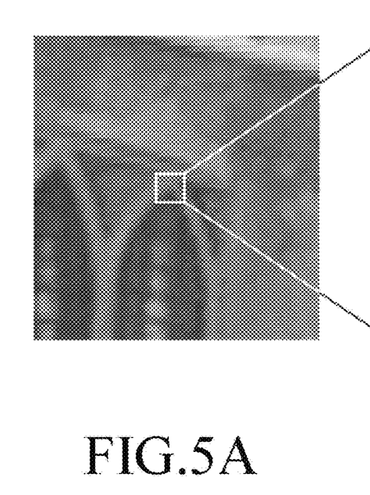
FIGS. 5A and 5B illustrate a pixel subject to a determination and comparison pixels surrounding the pixel in an input image, for determining a feature point when a primary feature is extracted according to an embodiment of the present disclosure.
Figure 5B:
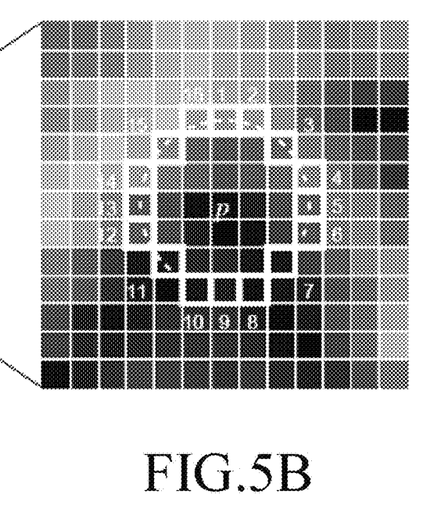

FIG. 4 illustrates an image in which a primary feature is extracted, and a plurality of feature points are displayed with a green color in the corresponding image; and FIGS. 5A and 5B illustrate a pixel subject to a determination and comparison pixels surrounding the pixel in the corresponding image, for determining a feature point when a primary feature is extracted, according to an embodiment of the present disclosure.

Referring to FIGS. 5A, and 5B, sixteen peripheral pixels radially spaced a predetermined distance apart from a pixel p, which is subject to a determination, are set as a comparison pixel. At this time, the corresponding image is converted into a black and white image for making it easier to determine a feature point, and a determination may be made as to whether each pixel is similar to the peripheral comparison pixels for determining the feature point, by using a color value, which may also be referred to as a luminance value, of the pixel.

Referring to FIG. 3, in operation 304, primary classification criteria set in advance is applied to the primary feature extracted in operation 302 for classifying the corresponding image as a document or non-document image. The primary classification criteria is set such that the corresponding image is more likely to be classified as a document image when the total number of the feature points is increased, and a standard deviation of color values, for example, luminance values of the feature points, is decreased, wherein the feature points are determined in operation 302. Although linear classification criteria, in which a total number of the feature points and the standard deviation of the luminance values of the feature points are used as two variables, may be applied as primary classification criteria, nonlinear classification criteria set in advance in a separate computing environment by using a machine learning algorithm of a Support Vector Machine (SVM) using a Radial Basis Function (RBF) kernel is applied as primary classification criteria for a more flexible and accurate determination in an embodiment of the present disclosure.

Figure 6:
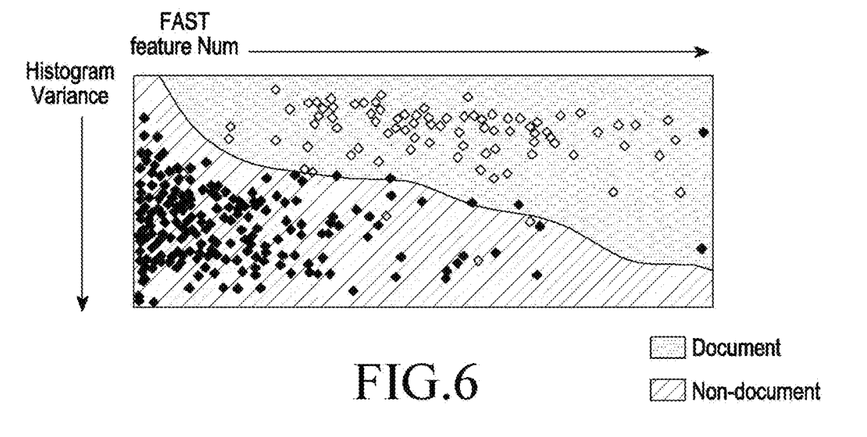
FIG. 6 illustrates primary classification criteria for a primary feature according to an embodiment of the present disclosure.

FIG. 6 illustrates primary classification criteria for a primary feature according to an embodiment of the present disclosure.

Referring to FIG. 6, primary classification criteria for a primary feature corresponding to SVM learning results for a total of 500 document/non-document images is illustrated.

After the primary classification criteria are applied to the primary feature, in operation 304, then a determination is made, in operation 306, as to whether the corresponding input image is a document image. When it is determined that the corresponding input image is a document image, then the operation flow proceeds to operation 308, and the corresponding input image is classified as a document image.

It can be seen, through above-described operations 302 to 308, that in the present disclosure, the corresponding input image is classified as a document image according to the total number of feature points extracted from the input image through the FAST feature algorithm and the standard deviation value of the luminance values, such as, for example, a color histogram, of the feature points. Since a typical document image has a property and/or characteristic that a large number of feature points are extracted through the FAST feature algorithm due to a lot of characters, and a standard deviation of luminance values of the feature points is small relative to that of a non-document image due to feature points located at a corner of the characters, the method according to the present disclosure allows for the typical document image to be more accurately classified as a document image. At this time, a normalized number of feature points, with a predetermined magnitude, may be used since the number of feature points is different depending on a size of an image.

Meanwhile, when it is determined, in operation 306, that the corresponding input image is not a document image, then the input image may be classified as a non-document image according to an embodiment of the present disclosure. However, in the embodiment of FIG. 3, if, in operation 306, it is determined that the corresponding input image is not a document image, then the operation flow proceeds from operation 310 to operation 314, and a secondary determination is made as to whether the corresponding input image is a document image. That is, in operation 310, a secondary feature is extracted from the image input in operation 302.

The extracting of the secondary feature, in operation 310, includes converting a region set in advance in the corresponding input image into a binary-coded image, obtaining minimal area rectangles including separated morphologies, which may also be referred to as character prediction areas, in the corresponding binary-coded image, respectively, and extracting information on slopes of the minimal area rectangles. Further operations illustrated in FIG. 3 will be discussed below with reference to FIGS. 7A through 9D.

Figures 7A, 7B:
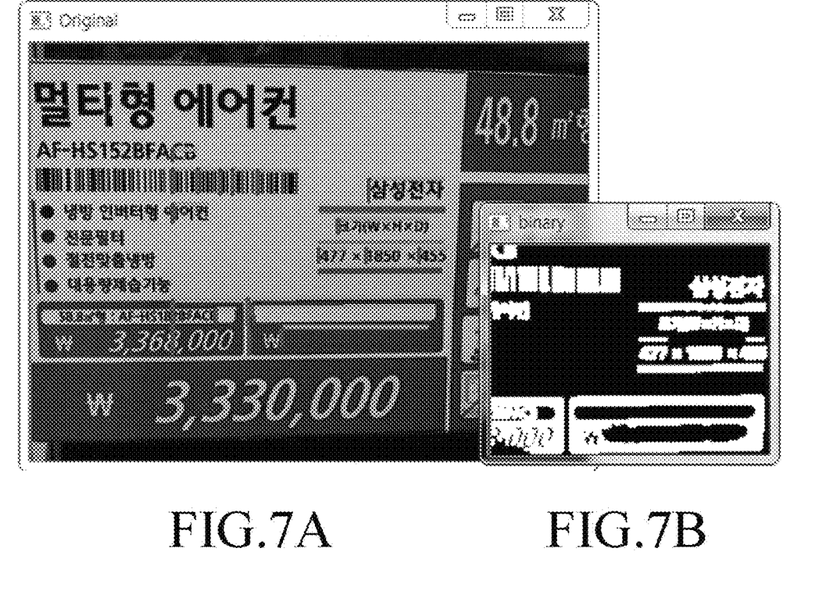
FIGS. 7A and 7B illustrate images in which a secondary feature is extracted according to an embodiment of the present disclosure.
Figures 8A, 8B:
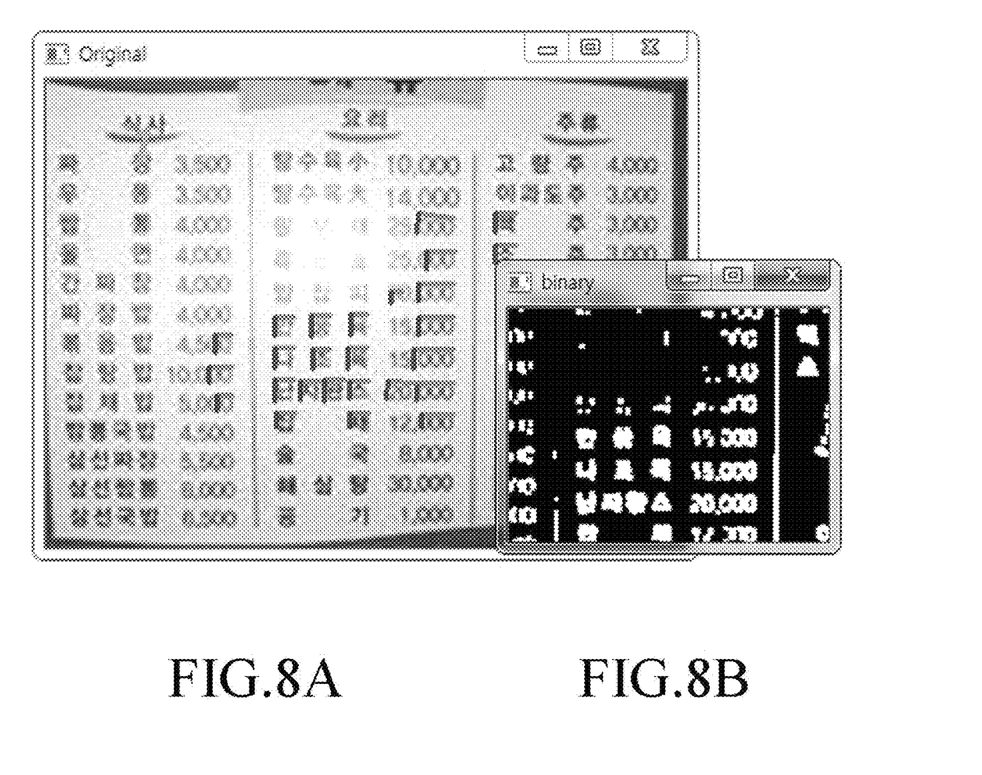
FIGS. 8A and 8B illustrate images in which a secondary feature is extracted according to an embodiment of the present disclosure.

FIGS. 7A to 8B illustrate images in which a secondary feature is extracted according to an embodiment of the present disclosure; and FIGS. 8A and 8B illustrate images in which a secondary feature is extracted according to an embodiment of the present disclosure.

Referring to FIGS. 7A and 8A, slopes obtained for character prediction areas in respective input images are displayed, and FIGS. 7B and 8B illustrate a binary-coded image into which a region set in advance in the input image (for example, a portion at the center of the input image) is converted.

FIGS. 9A, 9B, 9C and 9D illustrate a method of determining a slope of a character prediction area in a binary-coded image, for extracting slope information when a secondary feature is extracted according to an embodiment of the present disclosure.

Figure 9A:
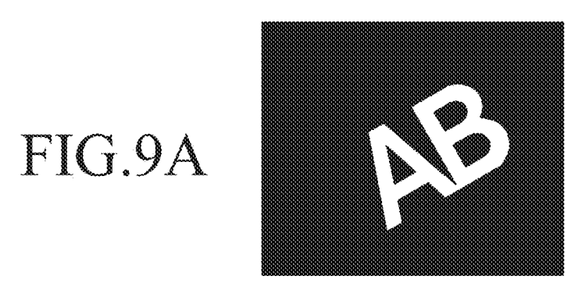
FIGS. 9A, 9B, 9C and 9D illustrate a method of determining a slope of a character prediction area in a binary-coded image, for extracting slope information when a secondary feature is extracted according to an embodiment of the present disclosure.
Figure 9B:
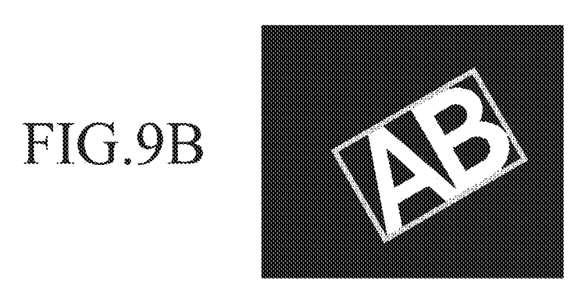

Referring to FIG. 9A, a binary-coded image, into which a region set in advance in an input image is converted, is illustrated. Referring to FIG. 9B, a minimal area rectangle, including a separated morphology, i.e. a character prediction area, in the corresponding binary-coded image, is illustrated. At this time, a character prediction area may be more easily differentiated in an image in which various colors of characters are mixed and/or in a document image in which various colors of backgrounds are mixed, through converting an input image into a binary-coded image.

FIGS. 9A and 9B illustrate a morphology in which "A" and "B" are adjacent to each other without any spacing. As the number of morphologies actually corresponding to characters is decreased, as described above, computational complexity for obtaining minimal area rectangles for the respective morphologies is reduced. Thus, when an input image is converted into a binary-coded image, morphologies of neighboring characters may also be connected with each other through a morphology dilation operation, which is one of a variety of general image processing techniques. Even if the morphologies of the characters are connected with each other, as described above, a slope of a finally obtained minimal area rectangle may be identical with, or more accurate than, that in a case where the morphologies of the characters are not connected.

Figure 9C:
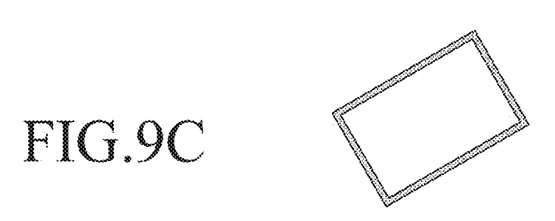
Figure 9D:
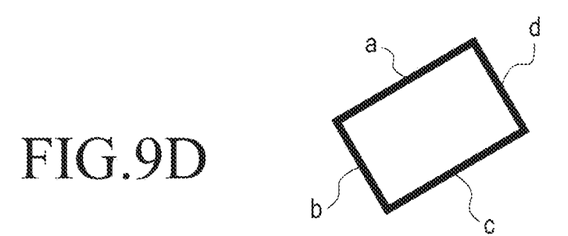

FIG. 9C illustrates a state in which a minimal area rectangle including a character prediction area, i.e., a morphology, and having a minimal area is obtained. Thereafter, as illustrated in FIG. 9D, slope information on the minimal area rectangle is obtained based on one edge, for example, a bottom edge or a top edge, of two horizontal edges, such as edges a and c and two vertical edges, such as edges b and d, of the minimal area rectangle. The slope information may be set as, for example, one of thirty equal angle indices based on the vertical or the horizontal.

As described above, the secondary feature may be extracted in operation 310, in which the secondary determination may be made as to whether the input image is a document image, by using only the slope information. However, in addition to that, information on the total number of feature points is also extracted in common with the first feature extraction, in operation 302, so as to be included in the secondary feature, when the secondary feature is extracted in operation 310 according to the embodiment of the present disclosure, wherein the secondary feature includes feature points which correspond to pixels determined not to be similar to comparison pixels through a comparison of the corresponding pixel to the neighboring comparison pixels, which are not adjacent to the corresponding pixel and which are spaced a predetermined distance apart from the corresponding pixel, for each pixel in the corresponding input image. In this case, the information on the feature points extracted in the first feature extraction may be used as it is.

Further, color value information on a pixel having a lowest color value, i.e., a lowest luminance value, from among sixteen comparison pixels around the feature point, is extracted in operation 310. As will be described below, such color value information is extracted in order to use the lowest color value of the peripheral comparison pixels, while not using a luminance value of the feature point itself. In other words, since a feature point obtained from a comparatively large-sized character in various document images by the FAST feature algorithm is occasionally set to a pixel outside the character, the aim is to use the lowest color value around the feature point unlike the method used for the primary classification criteria.

After the secondary feature is extracted in operation 310, then, in operation 312, secondary classification criteria, that has been set in advance, is applied to the secondary feature extracted in operation 310 for classifying the corresponding image as a document or non-document image. The secondary classification criteria is set such that the corresponding image is more likely to be classified as a document image when a deviation of the slopes for the morphologies obtained in operation 310 is decreased, when the total number of the feature points is increased, and when a deviation of the lowest color values of the comparison pixels for the feature points is decreased. At this time, nonlinear classification criteria, which has been set in advance in a separate computing environment by using a machine learning algorithm of a Support Vector Machine (SVM) using a Radial Basis Function (RBF) kernel, may be applied for the three variables.

When the secondary classification criteria is applied in operation 312, and in the case where only the information on the slopes has been obtained in operation 310, then only the standard deviation of the slopes may be applied as classification criteria.

As described above, the input image is more likely to be regarded as a document image in a case where the deviation of the slopes for the respective morphologies is decreased. The reason why the input image is classified as a document image in that case is because, in many cases character morphologies existing in a corresponding image have a slope of an identical or similar angle. Meanwhile, even when a corresponding image is obliquely photographed, so as not to be parallel or perpendicular to a target document to be photographed, then slopes of character morphologies existing in the corresponding image are identically inclined so that it may be determined whether the corresponding image is a document image through a determination as to whether the slopes are similar to each other.

After the secondary classification criteria are applied to the secondary feature, in operation 312, then a determination is made, in operation 314, as to whether the corresponding input image is a document image. When it is determined that the corresponding input image is a document image, then the operation flow proceeds to operation 308, and the corresponding input image is classified as a document image. Alternatively, when it is determined that the corresponding input image is not a document image, then the operation flow proceeds to operation 316. In operation 316, the corresponding input image is classified as a non-document image.

Figure 10A:
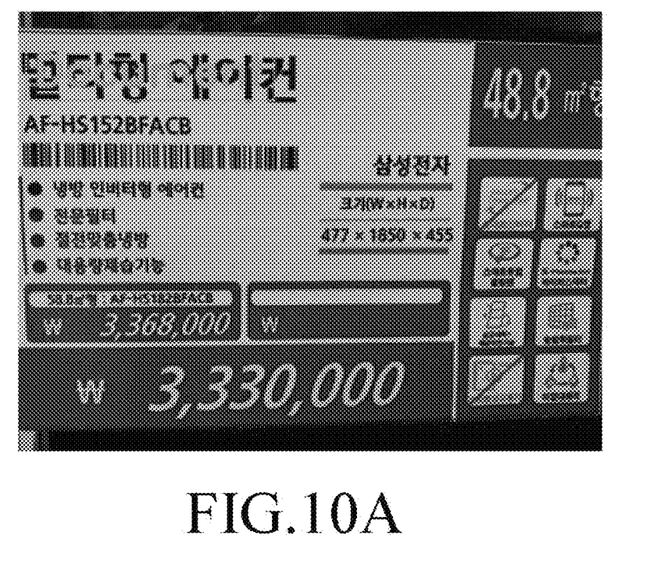
FIGS. 10A and 10B illustrate document images classified according to a result of the operations illustrated in FIG. 3 according to an embodiment of the present disclosure.
Figure 10B:
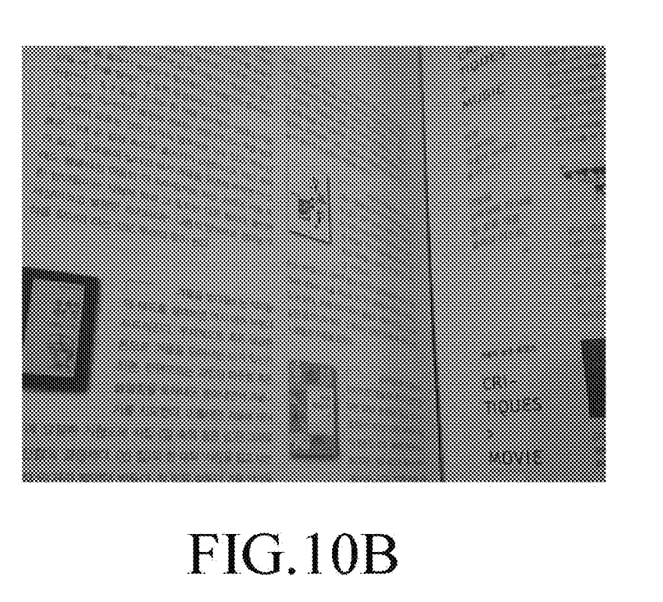

FIGS. 10A and 10B illustrate document images classified according to a result of the operations illustrated in FIG. 3, according to an embodiment of the present disclosure.

Referring to FIGS. 10A and 10B, although a label, "Document", may be separately added to the images of FIGS. 10A and 10B for convenience of description, the present disclosure is not limited thereto. That is, according to an embodiment of the present disclosure, the label "Document" may not additionally be composed with original images, and such an indicator indicating that the image is a document image may also be composed with the original images or displayed in a thumbnail of the original images according to an embodiment of the present disclosure.

Through an overview of the operations illustrated in FIG. 3, it can be seen that a two-step classification operation is performed for classification of the document image in the embodiment of the present disclosure. Namely, in a case of the primary classification, a document image having a generally identical background color and character color is classified, and in a case of the secondary classification, a document image, such as a bus schedule, a menu, a wall newspaper, a poster, and the like, which includes characters, but is not classified as a document image due to small number and various sizes and shapes, is classified.

Figure 11:
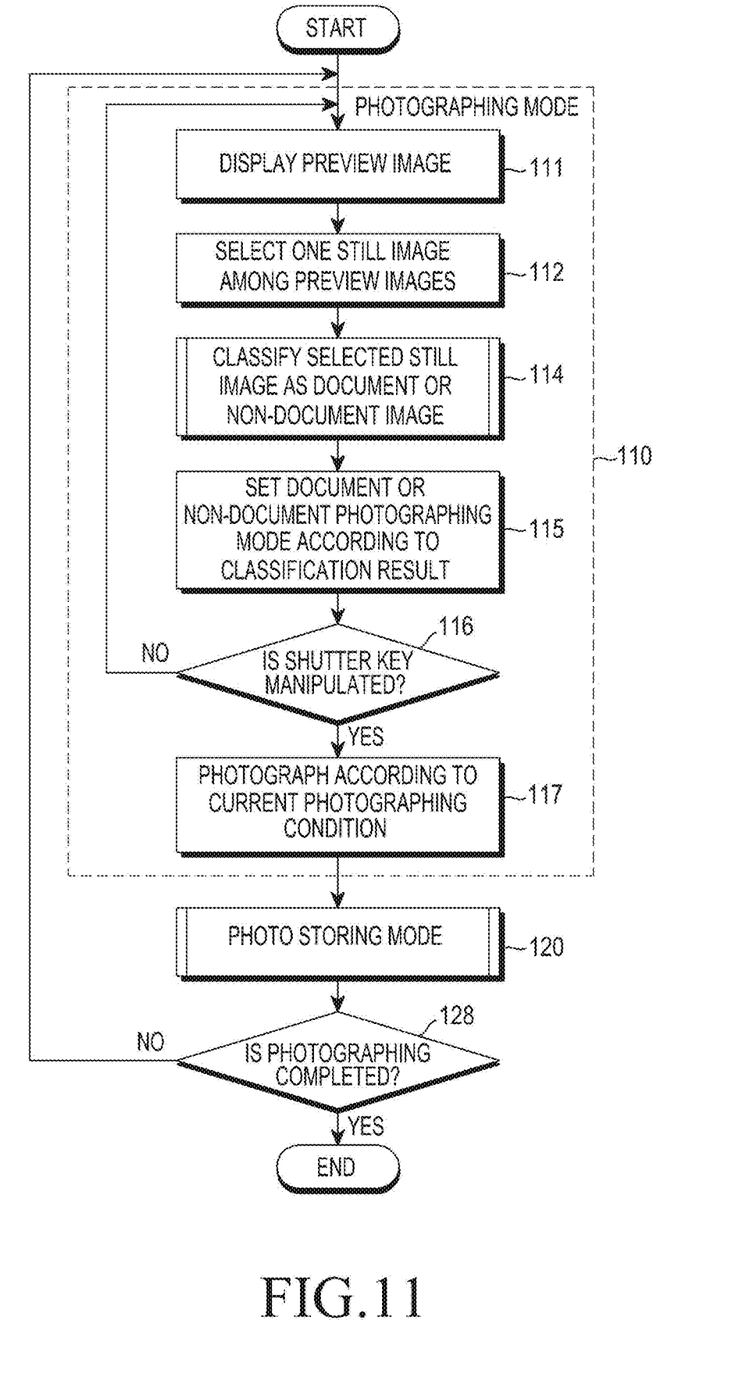
FIG. 11 is a flowchart illustrating a photographing operation to which a document image recognizing operation is applied according to an embodiment of the present disclosure.

FIG. 11 is a flowchart illustrating a photographing operation to which a document image recognizing operation is applied according to an embodiment of the present disclosure.

Referring to FIG. 11, the photographing operation may be performed under control of the controller in the device illustrated in FIG. 1. As illustrated in FIG. 11, the photographing operation, to which the present disclosure is applied, may be classified into an operation in a photographing mode 110 and an operation in a photo storing mode 120, and by way of example, a document image recognizing method of the present disclosure is performed in the photographing mode 110 in the embodiment illustrated in FIG. 11.

The photographing operation illustrated in FIG. 11 may be initiated through a user manipulation of a photographing key separately installed in advance in a portable terminal or a user selection of a menu for photographing in a menu environment.

In the photographing mode 110, an image currently being input through a camera unit is displayed as a preview image through a display unit in operation 111. One still image, from among the preview images, is selected in operation 112. The selected still image is classified as a document or non-document image in operation 114. The document/non-document image classification in operation 114 may be performed through the document/non-document classification operation illustrated in FIG. 3.

In operation 115, a document or non-document photographing mode is set according to the classification result of operation 114. In other words, a document and/or non-document photographing mode, having a photographing condition appropriately and differently set in advance depending on a document or non-document image, is configured in operation 115 according to the classification result obtained in operation 114. A determination is then made, in operation 116, as to whether a shutter key is manipulated. When it is determined that the shutter key has been manipulated, a photographing operation is performed according to a current document or non-document photographing condition in operation 117. The photographing condition for the document image in operations 115 and 117 may include setting conditions such as an exposure, a shutter speed, a sensitivity, and the like, such that a contrast between a character and a background is further emphasized, and also may include disabling an auto-flash mode.

After operation 117, the photo storing mode 120 is performed, and then a determination is made, in operation 128, as to whether a condition for completing the photographing, such as an input of a separately set end key, for example, a home button, is satisfied. When the condition for completing the photographing is satisfied, then the photographing operation is completed. At this time, in the photo storing mode 120, the photographed image classified as a document image and the photographed image classified as a non-document image may be differently stored in separate storage folders by using document/non-document information of the corresponding photographed image, or the photographed image classified as a document image may also be stored in a state where meta data, denoting that the photographed image is a document image, is displayed thereon.

As described above, the configurations and the operations for document image recognition may be made according to the embodiments of the present disclosure, and although specific embodiments of the present disclosure have been described above, various modifications may be made without departing from the scope and spirit of the present disclosure.

For example, the document/non-document image recognizing technology according to the present disclosure has been applied to the photographing operation, including the photographing mode and the photo storing mode, in the above-described embodiments. However, in addition to that, the document/non-document image recognizing technology, according to the present disclosure, may also be applied to an operation of collectively identifying and/or searching for a document or non-document image from among the previously stored photo-images. Further, the document/non-document image recognizing technology, according to the present disclosure, may be interworked and/or combined with an image character recognizing technology.

Although an embodiment of the present disclosure is applied to the photo-images photographed through the portable terminal, the document/non-document image recognizing technology, according to the present disclosure, may also be applied to other computing environments, such as networked computers, a desk-top computer, and any other similar and/or suitable computing environments, in addition to the portable terminal, and may be sufficiently applied to recognition of a document or non-document image through an analysis of images transferred from other external devices.

Although it has been described, in the present disclosure, that a total number of feature points in the corresponding image, and information on the comparison pixel having the lowest color value for each feature point as well as the slope deviation of the character prediction areas in the corresponding image, may be used as a secondary feature during the document/non-document image recognizing operation, according to the present disclosure as illustrated in FIG. 3, a total number of feature points in the corresponding image and information on the comparison pixel having the lowest color value for each feature point, except for the slope deviation of the character prediction areas in the corresponding image, may also be used as a secondary feature in an embodiment of the present disclosure.

In addition, the document/non-document image recognizing operation, according to the present disclosure, may be performed in parallel with the edge detection method described in the background of the disclosure, or may be performed in conjunction with the edge detection method.

It will be appreciated that the various embodiments of the present disclosure may be implemented in a form of hardware, software, a combination of hardware and software. Regardless of being erasable or re-recordable, such an optional software may be stored in a non-volatile storage device, such as a Read Only Memory (ROM), a memory such as a Random Access Memory (RAM), a memory chip, a memory device, an Integrated Circuit (IC), a processor, a controller, an Application Specific IC (ASIC), or a storage medium such as a Compact Disc (CD), a Digital Versatile Disc (DVD), a magnetic disc, or a magnetic tape that is optically or electromagnetically recordable and readable by a machine, for example, a computer. It will be appreciated that a memory, which may be incorporated in a portable terminal, may be an example of a machine-readable storage medium which is suitable for storing a program or programs including commands to implement the various embodiments of the present disclosure. Therefore, embodiments of the present disclosure provide a program including codes for implementing a system or method claimed in any claim of the accompanying claims and a machine-readable device for storing such a program. Moreover, such a program as described above may be electronically transferred through an arbitrary medium, such as a communication signal transferred through cable or wireless connection, and the present disclosure properly includes the elements and/or units equivalent to that.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of recognizing a document image, the method comprising:
    extracting, from an input image, a primary feature, including information on feature points, by determining each pixel that is not similar to comparison pixels to be a feature point through a comparison of the pixel to the comparison pixels spaced a predetermined distance apart from the pixel;
    classifying the input image as a document image or a non-document image by applying preset primary classification criteria, including criteria for a total number of the feature points, to the primary feature;
    determining, when it is determined that the input image is not a document image as a result of classifying the input image as the document image or the non-document image by applying the preset primary classification criteria, separated morphologies existing in a preset region for the input image to be character prediction areas;
    obtaining minimal area rectangles comprising the morphologies for the respective character prediction areas;
    extracting a secondary feature comprising information on slopes of the obtained minimal area rectangles; and
    classifying the input image as the document image or the non-document image by applying preset secondary classification criteria, including criteria for a difference in the slopes, to the secondary feature.

2. The method of claim 1, wherein the preset primary classification criteria comprises classification criteria set in advance by using a machine learning algorithm such that the input image is classified as a document image when the total number of the feature points extracted for the primary feature is increased and when a deviation of color values of the feature points is decreased.

3. The method of claim 1,
    wherein the input image is converted into a black and white image, and
    wherein sixteen peripheral pixels, which are radially spaced a predetermined distance apart from a pixel subject to determination, are set as the comparison pixels when the feature points are determined.

4. The method of claim 1, wherein the secondary feature further comprises:
    information on the total number of the feature points for the input image; and
    information on color values of pixels having a lowest color value from among the comparison pixels of the feature points.

5. The method of claim 4, wherein the preset secondary classification criteria comprises the total number of the feature points and the criteria for the color values of the comparison pixels having the lowest color value.

6. The method of claim 5,
    wherein the preset secondary classification criteria comprises nonlinear classification criteria, which is set in advance by using a machine learning algorithm such that the input image is classified as the document image as a deviation of the slopes is decreased, as the total number of the feature points is increased, and as a deviation of the color values of the comparison pixels having the lowest color value is decreased, and
    wherein the slopes, the total number of the feature points, and the color values have been extracted for the secondary feature.

7. The method of claim 1,
    wherein the input image is converted into a binary-coded image, and
    wherein morphologies of neighboring characters are connected with each other, through a morphology dilation operation, when the secondary feature is extracted.

8. A device for recognizing a document image, the device comprising:
    a camera configured to photograph an external target object; and
    an image processor configured to:
        perform an image processing operation on at least one of an image photographed by the camera and images transferred from an external device,
        extract, from an input image, a primary feature, including information on feature points, by determining each pixel that is not similar to comparison pixels to be a feature point through a comparison of the pixel to the comparison pixels spaced a predetermined distance apart from the pixel,
        classify the input image as a document image or a non-document image by applying preset primary classification criteria, including criteria for a total number of the feature points to the primary feature,
        determine, when it is determined that the input image is not a document image as a result of classifying the input image as the document image or the non-document image by applying the preset primary classification criteria, separated morphologies existing in a preset region for the input image to be character prediction areas,
        obtain minimal area rectangles comprising the morphologies for the respective character prediction areas,
        extract a secondary feature comprising information on slopes of the obtained minimal area rectangles, and classify the input image as the document image or the non-document image by applying preset secondary classification criteria, including criteria for a difference in the slopes to the secondary feature.

9. The device of claim 8, wherein the preset primary classification criteria comprises classification criteria set in advance by using a machine learning algorithm such that the input image is classified as a document image when the total number of the feature points extracted for the primary feature is increased and when a deviation of color values of the feature points is decreased.

10. The device of claim 8,
wherein the image processor is further configured to:
convert the input image into a black and white image, and
set sixteen peripheral pixels, which are radially spaced a predetermined distance apart from a pixel subject to determination, as the comparison pixels when determining the feature points.

11. The device of claim 8, wherein the secondary feature further comprises:
information on the total number of the feature points for the input image; and
information on color values of pixels having a lowest color value from among the comparison pixels of the feature points.

12. The device of claim 11, wherein the preset secondary classification criteria comprises the total number of the feature points and the criteria for the color values of the comparison pixels having the lowest color value.

13. The device of claim 12,
wherein the preset secondary classification criteria comprises nonlinear classification criteria, which is set in advance by using a machine learning algorithm such that the input image is classified as the document image as a deviation of the slopes is decreased, as the total number of the feature points is increased, and as a deviation of the color values of the comparison pixels having the lowest color value is decreased, and
wherein the slopes, the total number of the feature points, and the color values have been extracted for the secondary feature.

14. The device of claim 8, wherein the image processor is further configured to:
convert the input image into a binary-coded image when extracting the secondary feature, and
connect morphologies of neighboring characters with each other through a morphology dilation operation.

15. A photographing method using a document image recognizing technology, the photographing method comprising:
performing, by a camera, a photographing operation on a target object through a preset photographing manipulation;
classifying and storing a photographed image as a document image or non-document image, the classifying of the photographed image comprising:
receiving the photographed image,
extracting, from an input image, a primary feature, including information on feature points by determining each pixel that is not similar to comparison pixels to be a feature point through a comparison of the pixel to the comparison pixels spaced a predetermined distance apart from the pixel, and
classifying the input image as a document image or a non-document image by applying preset primary classification criteria, including criteria for a total number of the feature points to the primary feature;
determining, when it is determined that the input image is not a document image as a result of classifying the input image as the document image or the non-document image by applying the preset primary classification criteria, separated morphologies existing in a preset region for the input image to be character prediction areas;
obtaining minimal area rectangles comprising the morphologies for the respective character prediction areas;
extracting a secondary feature comprising information on slopes of the obtained minimal area rectangles; and
classifying the input image as the document image or the non-document image by applying preset secondary classification criteria, including criteria for a difference in the slopes to the secondary feature.

16. The photographing method of claim 15, wherein the images classified as the document image or the non-document image are differently stored in separate storage folders, or the images classified as the document image include information indicating that the image is a document image, when the images are classified and stored as the document image or the non-document image.

17. The photographing method of claim 15, wherein the preset primary classification criteria comprises classification criteria set in advance by using a machine learning algorithm such that the input image is classified as a document image when the total number of the feature points extracted for the primary feature is increased and when a deviation of color values of the feature points is decreased.

18. The photographing method of claim 15,
wherein the secondary feature further comprises information on a total number of the feature points for the input image, and information on color values of comparison pixels having a lowest color value from among the comparison pixels of the feature points, and
wherein the secondary classification criteria comprises the total number of the feature points, and criteria for the color values of the comparison pixels having the lowest color value.

19. The photographing method of claim 15,
wherein the secondary classification criteria comprises nonlinear classification criteria, which is set in advance by using a machine learning algorithm such that the input image is classified as the document image as a deviation of the slopes is decreased, as the total number of the feature points is increased, and as a deviation of the color values of the comparison pixels having the lowest color value is decreased, and
wherein the slopes, the total number of the feature points, and the color values have been extracted for the secondary feature.

* * * * *